United States Patent
Van Vliembergen et al.

(10) Patent No.: US 10,635,363 B2
(45) Date of Patent: Apr. 28, 2020

(54) ROLL-FED PRINTING APPARATUS, SOFTWARE MEDIUM, AND METHOD FOR CONTROLLING A ROLL-FED PRINTING APPARATUS

(71) Applicant: Océ Holding B.V., Venlo (NL)

(72) Inventors: Eduardus J. W. Van Vliembergen, Venlo (NL); Elsemieke P. A. Van Rossum, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 0 days.

(21) Appl. No.: 16/029,419

(22) Filed: Jul. 6, 2018

(65) Prior Publication Data
US 2019/0018627 A1    Jan. 17, 2019

(30) Foreign Application Priority Data
Jul. 14, 2017    (EP) .................................... 17181368

(51) Int. Cl.
G06K 15/02    (2006.01)
H04N 1/403    (2006.01)
G06F 3/12    (2006.01)

(52) U.S. Cl.
CPC ............ G06F 3/1219 (2013.01); G06F 3/126 (2013.01); G06F 3/1208 (2013.01);
(Continued)

(58) Field of Classification Search
CPC .............................. G06F 3/1251; H04N 1/403
See application file for complete search history.

(56) References Cited

U.S. PATENT DOCUMENTS

| | | | | |
|---|---|---|---|---|
| 9,342,765 B2 * | 5/2016 | Ozawa | .................... | B41J 11/008 |
| 2008/0159800 A1 * | 7/2008 | Wada | ..................... | B26D 5/005 |
| | | | | 400/621 |

(Continued)

FOREIGN PATENT DOCUMENTS

JP    2008-273025 A    11/2008
WO    WO 2016/066737 A1    5/2016

*Primary Examiner* — King Y Poon
*Assistant Examiner* — Michael L Burleson
(74) *Attorney, Agent, or Firm* — Birch, Stewart, Kolasch & Birch, LLP (57) ABSTRACT

A roll-fed printing apparatus and a method for controlling the roll-fed printing apparatus for printing print jobs on a recording medium by means of a print mechanism. The method comprising the steps of receiving a print job with print job settings, adding the print job to a print queue of the roll-fed printing apparatus, specifying a first start position on the recording medium for printing the print job, due to a planned finishing action automatically adding an additional job to the print queue in order just behind the print job or in order just before the print job, specifying a second start position on the recording medium for processing the additional job in a neighborhood on the recording medium of the print job, specifying a width and a length on the recording medium for processing the additional job, the width and the length determined by the kind of the finishing action, upon arrival of the print job at the head of the print queue or upon arrival of the additional job at the head of the print queue whichever arrives at first, printing the print job and processing the additional job at the first start position and at the second start position respectively, wherein the additional job is a non-printing job during execution of which the recording medium is moved relative to the print mechanism without any printing at the second start position over an area which corresponds to the specified length and width.

8 Claims, 6 Drawing Sheets

(52) U.S. Cl.
CPC .......... *G06F 3/1251* (2013.01); *G06F 3/1263* (2013.01); *G06F 3/1264* (2013.01); *G06F 3/1282* (2013.01); *G06K 15/022* (2013.01); *G06K 15/1868* (2013.01)

(56) References Cited

U.S. PATENT DOCUMENTS

| | | | |
|---|---|---|---|
| 2011/0211857 A1* | 9/2011 | Mikami | G03G 15/5029 399/82 |
| 2013/0135377 A1* | 5/2013 | Serizawa | B41J 11/008 347/14 |
| 2014/0313530 A1* | 10/2014 | Noguchi | G06K 15/002 358/1.12 |
| 2017/0217225 A1 | 8/2017 | Bouwmans et al. | |

\* cited by examiner

ROLL-FED PRINTING APPARATUS, SOFTWARE MEDIUM, AND METHOD FOR CONTROLLING A ROLL-FED PRINTING APPARATUS

FIELD OF THE INVENTION

The present invention generally pertains to a roll-fed printing apparatus, such as a roll-to-roll inkjet printing apparatus, for printing images on a recording medium such as paper. The invention also pertains to a non-transitory software medium comprising executable code configured to, when executed, perform a method for controlling a roll-fed printing apparatus. The invention also pertains to a method for controlling a roll-fed printing apparatus for printing print jobs on a recording medium by means of a print mechanism, the method comprising the steps of receiving a print job with print job settings and adding the print job to a print queue of the roll-fed printing apparatus.

BACKGROUND ART

Roll-fed printers are a well-known type of printers. In roll-fed printers, a recording medium such as paper is wound up on an input roll and then fed into, and guided along, a path through the printer, unwinding the input roll by and by along the process. In this way, the recording medium is roll-fed (i.e. taken from a roll and fed) to a marking unit of the printer which applies a marking material (prints) onto the recording medium Roll-to-roll printers are a common type of roll-fed printers and are characterized in that the recording medium is, after images have been printed on it, wound up on an output holder of an output roll by and by along the process.

Some roll-fed printers comprise a cutting unit, i.e. a cutter, being configured to cut the recording medium after images have been printed on it such that the printer does not output the entire contiguous recording medium but instead cut pieces of it.

Some roll-fed printers comprise a laminating unit, i.e. a laminator, being configured to laminate the recording medium after images have been printed on it such that the robustness of the printed images is increased.

Roll-fed printers are very efficient devices for forming a large number of images requiring a large amount of the recording medium, as the wound-up input rolls are comparatively easy to handle by both the printers and their operating personnel. Accordingly, little or no supervision by personnel is needed for roll-fed printers, especially for roll-to-roll printers, as the marked recording medium is automatically stored on the output roll.

A print job may be added to the print queue automatically, directly, by means of a job submitter or may be dragged from a job list area into the print queue. A roll planner may be part of the print queue which also shows future events like pauses, inspection moments, cuts, etc. The roll planner also shows how much space is left on the recording medium and is used by the operator to optimize the jobs in time to minimize the number of roll changes.

However, finishing like cutting or laminating sometimes has its own requirements. For example, if a smaller image that has to be cut is followed by a larger image, a result may be that some unintended cuts are made in the large image. It takes some time to adapt positions of knifes. Another example is that in order to laminate a roll additional white space is needed at a start of the roll. Another example is that in order to post-process a number of printed images on the roll, a predetermined amount of length meters of the roll, for example x meters, is desired for the post-processing machine, so a predetermined cut may be planned every x meters of the roll.

It is desirable to have a method for controlling a roll-fed printing apparatus that makes optimum use of the available printing apparatus and enables faultless finishing of the printed images on the roll. It is also desirable to have a roll-fed printing apparatus capable of executing such a method.

SUMMARY OF THE INVENTION

Thereto the method of the invention comprises the steps of specifying a first start position on the recording medium for printing the print job, due to a planned finishing action automatically adding an additional job to the print queue in order just behind the print job or in order just before the print job, specifying a second start position on the recording medium for processing the additional job in a neighborhood on the recording medium of the print job, specifying a width and a length on the recording medium for processing the additional job, the width and the length determined by the kind of the finishing action, upon arrival of the print job at the head of the print queue or upon arrival of the additional job at the head of the print queue whichever arrives at first, printing the print job and processing the additional job at the first start position and at the second start position respectively, wherein the additional job is a non-printing job during execution of which the recording medium is moved relative to the print mechanism without any printing at the second start position over an area which corresponds to the specified length and width.

The addition of the additional job according to the invention solves the problems raised because of the finishing requirements mentioned in the background art here-above.

According to an embodiment the planned finishing action is specified in the print job settings of the print job.

According to an embodiment the planned finishing action is a laminating action at least at a position on the recording medium where the print job is printed.

According to an embodiment the planned finishing action is a laminating action at least at a position on the recording medium where the print job is printed and the additional job is added in time just after or in time just before the print job in the print queue.

According to an embodiment the planned finishing action is a laminating action at least at a position on the recording medium where the print job is printed and the additional job is added in time just after the print job in the print queue. When a roll has been printed, the laminating will start at the end of the printed roll between the end of the roll and the last print job printed on the roll.

According to an embodiment the planned finishing action is a laminating action at least at a position on the recording medium where the print job is printed and the additional job is added in time just before the print job in the print queue. In case of more than one processing step to be executed on the receiving medium before the laminating action, a sequence order of the print job and the additional job may be reversed. For example, this may happen when the recording medium is first printed, then the printed roll is varnished or once more treated by a UV curing mechanism, and then eventually laminated. In another case the printed may be rewound to get a tighter roll having a better winding quality which also leads to an extra process step before laminating. In other words the end of the roll becomes the start of the roll and vice versa in case of adding one additional process step before the laminating action. Also in case of double sided printing extra process steps may be involved before the laminating action takes place.

In general, when adding an odd number of processing steps, in which the roll is rewound, before the laminating action, the additional job will be planned just before the print job. In general, when adding an even number of processing steps, in which the roll is rewound, before the laminating action, the additional job will be planned just after the print job.

According to an embodiment the planned finishing action is a lengthwise cut along a printed image of the print job, the width of the printed image being not equal to the width of an image of a subsequent print job in the print queue, and the additional job is added in time just behind the print job in the print queue and just before the subsequent print job.

According to an embodiment the planned finishing action is a lengthwise cut of the recording medium between a first image of the print job intended to be printed at the first starting position and a second image of the same print job or a subsequent print job in the print queue which second image is intended to be printed next to the first image in a widthwise direction, and the method comprises the step of adjusting a starting position on the recording medium for printing the second image such that the additional job is arranged in between a location on the recording medium at which the first image is intended to be printed and a location on the recording medium at which the second image is intended to be printed.

According to an embodiment a size of the first image is not equal to a size of the second image.

According to an embodiment the planned finishing action is a widthwise cut of the recording medium along an entire width of the recording medium, and the additional job is added in the queue such that the second starting position on the recording medium of the additional job is in accordance with a constant predetermined distance interval in a lengthwise direction of the recording medium.

The invention also relates to a roll-fed printing apparatus for printing images on a recording medium, comprising a controller for controlling a print queue comprising a print job to be printed, wherein the controller is configured to automatically add due to a planned finishing action an additional job in the print queue just before or just after the print job, to specify a starting position for the additional job on the recording medium in a neighborhood of the print job on the recording medium, and to specify a width and a length on the recording medium for processing the additional job, the width and the length determined by a kind of the planned finishing action, and wherein the additional job is a non-printing job during execution of which the recording medium is moved relative to the print mechanism without any printing at the start position over an area which corresponds to the specified length and width.

Preferably, the roll-fed printing apparatus is a roll-to-roll inkjet printing apparatus.

The invention also relates to a non-transitory software medium comprising executable code configured to, when executed, perform the method according to the invention.

The term "printing" is used herein as a general term for any marking of a recording medium with any marking material. As a synonym, the term "image forming" may be used. Recording mediums may comprise paper, flexible plastic, metal foils, textiles and so on. Marking materials may comprise ink, metal, varnish, toner and so on. "Marking" may be any process by which the marking material is applied to the recording medium.

The term "successfully printed" may be synonymous with "completely printed". The term may, however, comprise additional criteria, for example the criterion that the print job has been formed on the recording medium exactly as was intended by the data characterizing said print job, e.g. all pixels of the bitmap characterizing that print job are exactly reproduced on the recording medium. Another possible criterion for a "successfully printed" print job may be that the print job has been printed exactly at the position of the recording medium intended for it. Depending on the used recording medium and the used marking material, an additional criterion for a "successfully printed" print job may be that the print job has been printed with a certain thickness on the recording medium, e.g. when an integrated circuit is printed in metal.

Additional advantages, and the solution of additional problems, will be apparent from the subject-matter of the dependent claims as well as from the description and the drawings.

The term "marking unit" refers to a structure, a device, or a system, within the roll-fed printing apparatus that performs the actual printing, i.e. the marking of the recording medium with the marking material. For example, the marking unit of an inkjet printing apparatus is an inkjet print head.

"Downstream" herein, and in the following, is applicable to positions that are reached later by the recording medium moving along the intended path starting from an input roll of the roll-fed printing apparatus than positions "upstream". For example, the marking unit (e.g. an inkjet print head of an inkjet printing apparatus) is arranged downstream of the input roll.

BRIEF DESCRIPTION OF THE DRAWINGS

The present invention will become more fully understood from the detailed description given hereinbelow and the accompanying schematic drawings which are given by way of illustration only, and thus are not limitative of the present invention, and wherein.

DETAILED DESCRIPTION OF THE DRAWINGS

The present invention will now be described with reference to the accompanying drawings, wherein the same reference numerals have been used to identify the same or similar elements throughout the several views, and in some instances throughout the several embodiments.

Figure 1:
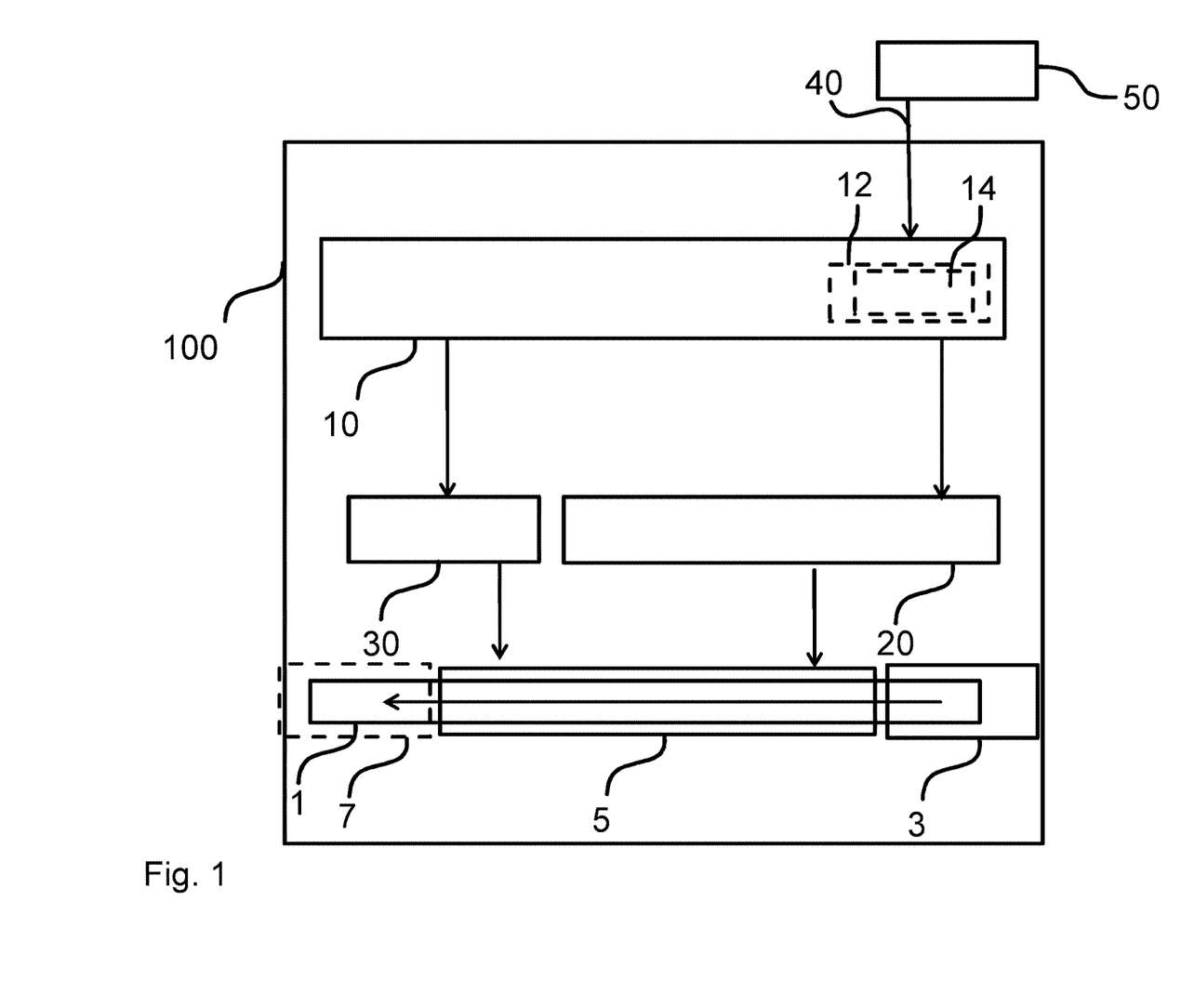
FIG. 1 schematically shows a roll-fed printing apparatus according to an embodiment of the invention.

FIG. 1 schematically shows a roll-fed printing apparatus 100 according to an embodiment. For the following detailed description, reference will also be made to depictions and reference signs in following FIGS. 2-4 which may better illustrate the function of the roll-fed printing apparatus 100 in general and a controller 10 comprising a roll managing system 12 in particular.

In the roll-fed printing apparatus 100, recording medium 1 is initially wound up on an input roll 3 and is therefrom guided, by and by, along a path 5 of the roll-fed printing apparatus 100. If the roll-fed printing apparatus 100 is, specifically, a roll-to-roll inkjet printing apparatus, then the roll-to-roll inkjet printing apparatus may additionally comprise an output roll 7 onto which the recording medium 1 is wound, by and by, after it has been marked according to a print job. The path 5 comprises actors and other components to move, and guide, the recording medium 1 along.

The roll-fed printing apparatus 100 comprises a print engine 20 configured to mark the recording medium 1, using a marking material, in accordance with specifications of the image to be printed. A large number of individual ripped images to be printed may be submitted to the roll-fed printing apparatus 100.

For creating the printed roll, at least one gathering criterion is applied. The at least one gathering criterion may comprise a criterion that the individual ripped images shall be created such that as many of the individual ripped images are able to be printed before a specific resource of, or available to, the roll-fed printing apparatus 100 is depleted to a certain amount or percentage. The percentage may, for example, be zero percent.

The percentage may alternatively be set to a larger percentage than zero, for example, 5% (five percent). In that way, possible errors in the determination, or prediction, of the remaining amount of that resource are taken into account and it is made sure that the last individual ripped images printed are actually printed while the specific resource is still undepleted. For example, it may be undesirable to print until ink is depleted down to zero percent as, at very low ink levels, the printing results and/or the reliability of an ink level estimation may vary.

In the case that more than one gathering criteria are applied, the percentages for all of the criteria may be equal, e.g. zero. There may also be a different percentage set for each, or for a number of, the applied gathering criteria.

The specific resource may be at least one of time, marking material, and the recording medium 1. For roll-fed or roll-to-roll inkjet printing apparatus, for example, the specific resource may be at least one of time, ink, and remaining recording medium upstream of a print head of the inkjet printing apparatus.

A printer controller 10 of the roll-fed printing apparatus 100 is configured to control the roll-fed printing apparatus 100, as will be described in more detail in the following.

The controller 10 comprises the roll managing system 12 for managing the printing of ripped images on the recording medium 1. The controller 10 is able to receive a plurality of ripped images from an external and independent raster image processor 50 via a digital network connection 40 in memory 14 of the roll managing system 12 irrespectively of the presence of the appropriate recording medium in the roll-fed printing apparatus 100. An appropriate recording medium is for example the recording medium specified for the images to be printed. The receipt of the plurality of ripped images may also be irrespectively of the readiness of the printer, i.e. the printer may still be printing other images.

For each ripped image the roll managing system 12 is configured to establish an arbitrary position in the plane of the recording medium 1 at which arbitrary position the ripped image is intended to be printed, The controller 10 is configured to create subsequent image swathes for printing the ripped images according to the established arbitrary positions of the ripped images. The print engine 20 subsequently prints the created subsequent image swathes.

The roll managing system 12 monitors a first actual status of printing of the created subsequent image swathes, a second actual status of a timing of the ripped images to be printed and a third actual status of the recording medium 1.

The roll managing system 12 is configured to display and keeping up-to-date a dynamic roll preview area representing the at least one recording medium, the planned ripped images to be printed on the at least one recording medium, the ripped images currently being printed on the at least one recording medium and image items representing the monitored first, second and third actual statuses. The dynamic roll preview area will be further elucidated hereinafter in FIG. 4.

According to another embodiment the raster image processor 50 receives from the roll-fed printing apparatus 100 the first actual status of printing of created subsequent image swathes, the second actual status of a timing of the ripped images to be printed and the third actual status of the at least one recording medium loaded in the roll-fed printing apparatus 100. These three actual statuses are used by the raster image processor 50 to keep up-to-date a dynamic roll preview area to be displayed on a user interface (not shown) connected to the raster image processor 50 based on the first actual status, the second actual status and the third actual status. Such a user interface may contain a window like the window shown in FIG. 4. The user interface may be a cloud user interface which is connected via a network to the raster image processor 50 and the roll-fed printing apparatus 100. According to a further embodiment the roll managing system 12 is situated in the raster image processor instead of in the roll-fed printing apparatus 100.

The controller 10 may further be configured to control a component of the printing apparatus 100 arranged downstream of the print engine 20 of the printing apparatus 100. The controlled component may, e.g., be a cutting unit, i.e. a cutter, being configured to cut the recording medium 1 according to given cut paths or commands entered by the operator or indicated in a user interface window of the roll managing system 12. That controlled component may e.g. also be a laminating unit 30 for laminating the recording medium 1.

Figure 2:
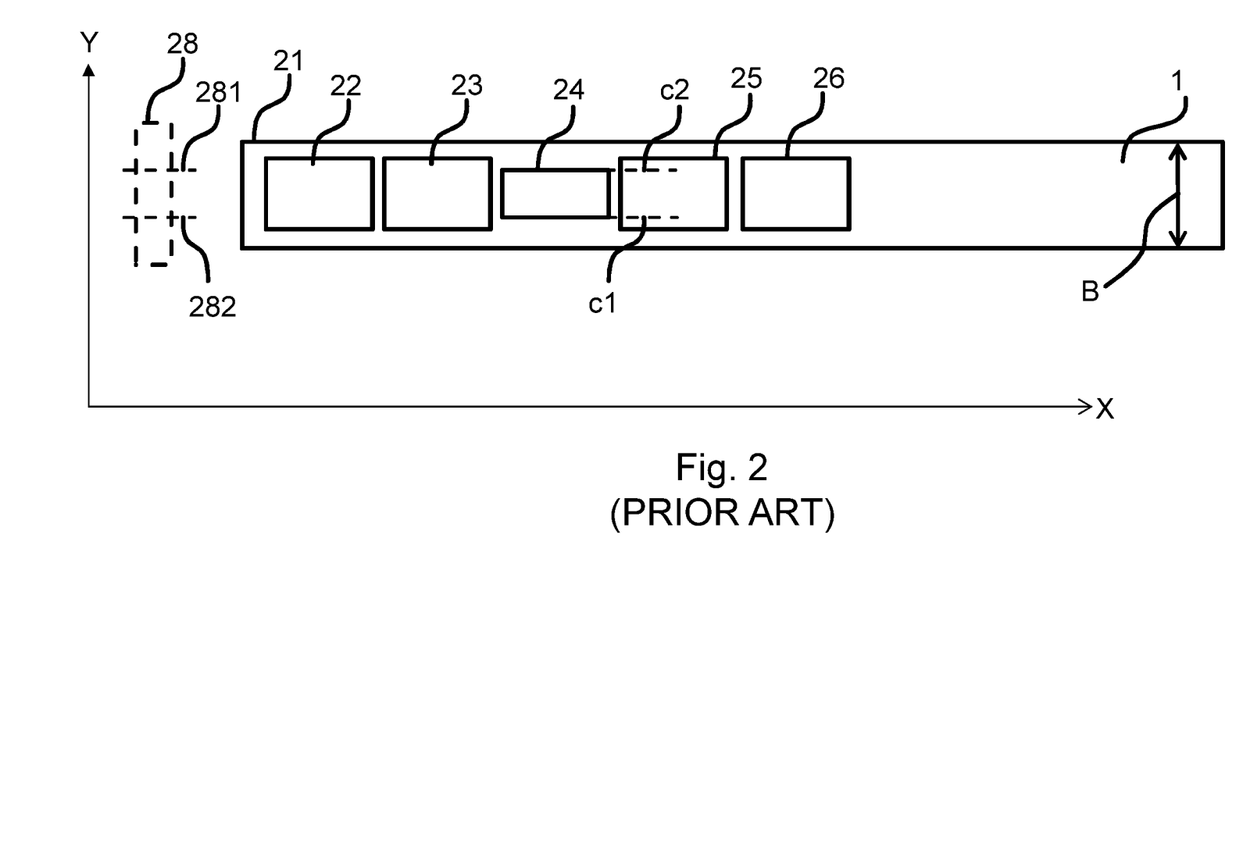
FIG. 2 schematically shows a view of a recording medium for illustrating the function of a roll-fed printing apparatus according to the prior art.

In FIG. 2, a schematic view of a recording medium 1 during the printing of a number of five individual ripped images is shown according to the prior art. This number five is only chosen as an example; it should be understood that less, or more, individual ripped images may be printed on the recording medium. The number of individual ripped images comprises five individual ripped images designated as 22, 23, 24, 25, 26. The right-most area of the recording medium 1 in FIG. 2 is left empty to symbolize that additional individual ripped images might be printed on the remaining length of the recording medium 1.

It is also evident from FIG. 2 that the individual ripped images 22-26 are positioned at arbitrary positions with X, Y coordinates along axes X, Y which are respectively parallel to a length direction and to a width direction B of the recording medium 1. The individual ripped images 22-26 are arranged side-by-side along the length of the recording medium 1 (from left to right in FIG. 2) along which the recording medium 1 is moved during the printing of the images 22-26.

Note that FIG. 2 shows the intended arrangement of the individual ripped images 21-26 on the recording medium 1 for the case that there are no error or interruptions and that the printing of the individual ripped images is carried out on a same recording medium 1.

As the individual ripped image 24 is smaller in width than the subsequent ripped image 25, a cutting process of printed image 24 out of the roll 1 with cut lines c1 and c2 may be problematic. The cutting of printed image 24 along the cut lines c1 and c2 may be executed by a cutter 28 having two cut knifes 281, 282 in the direction X. The cutting of the printed image 24 along the cut lines c1 and c2 may damage the subsequent printed image 25, since adaptation of positions of the cut knifes 281, 282 in the direction B may take some while and may not be completed when the printed image 25 arrives at the cutter 28.

Figure 3:
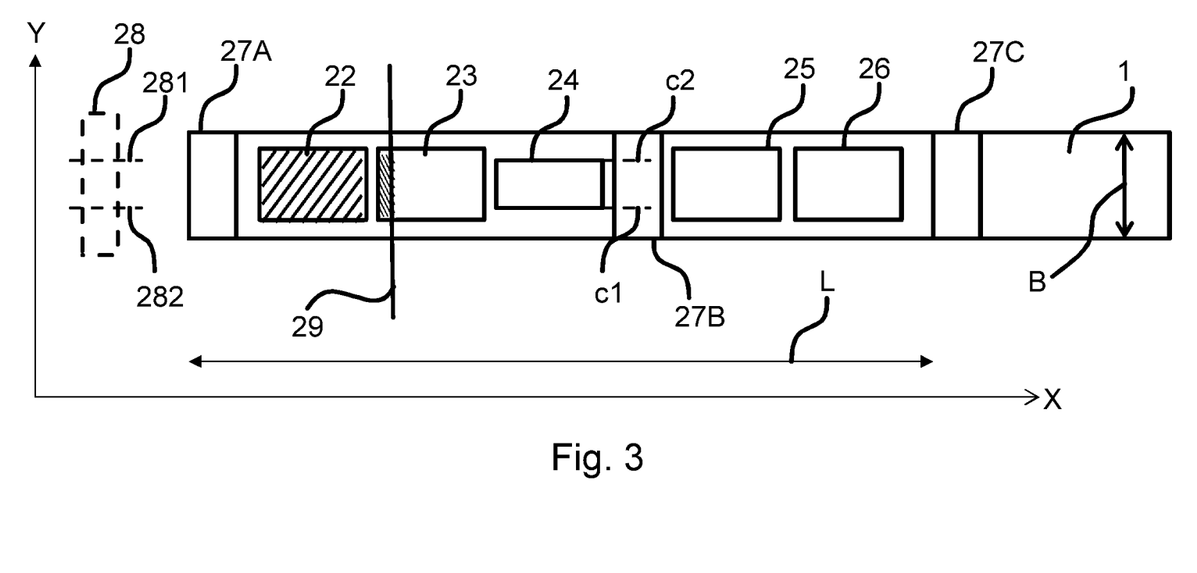
FIG. 3 schematically shows a view of a recording medium for illustrating the function of the roll-fed printing apparatus of FIG. 1 as well as the method of FIG. 5 according to the invention.
Figure 5:
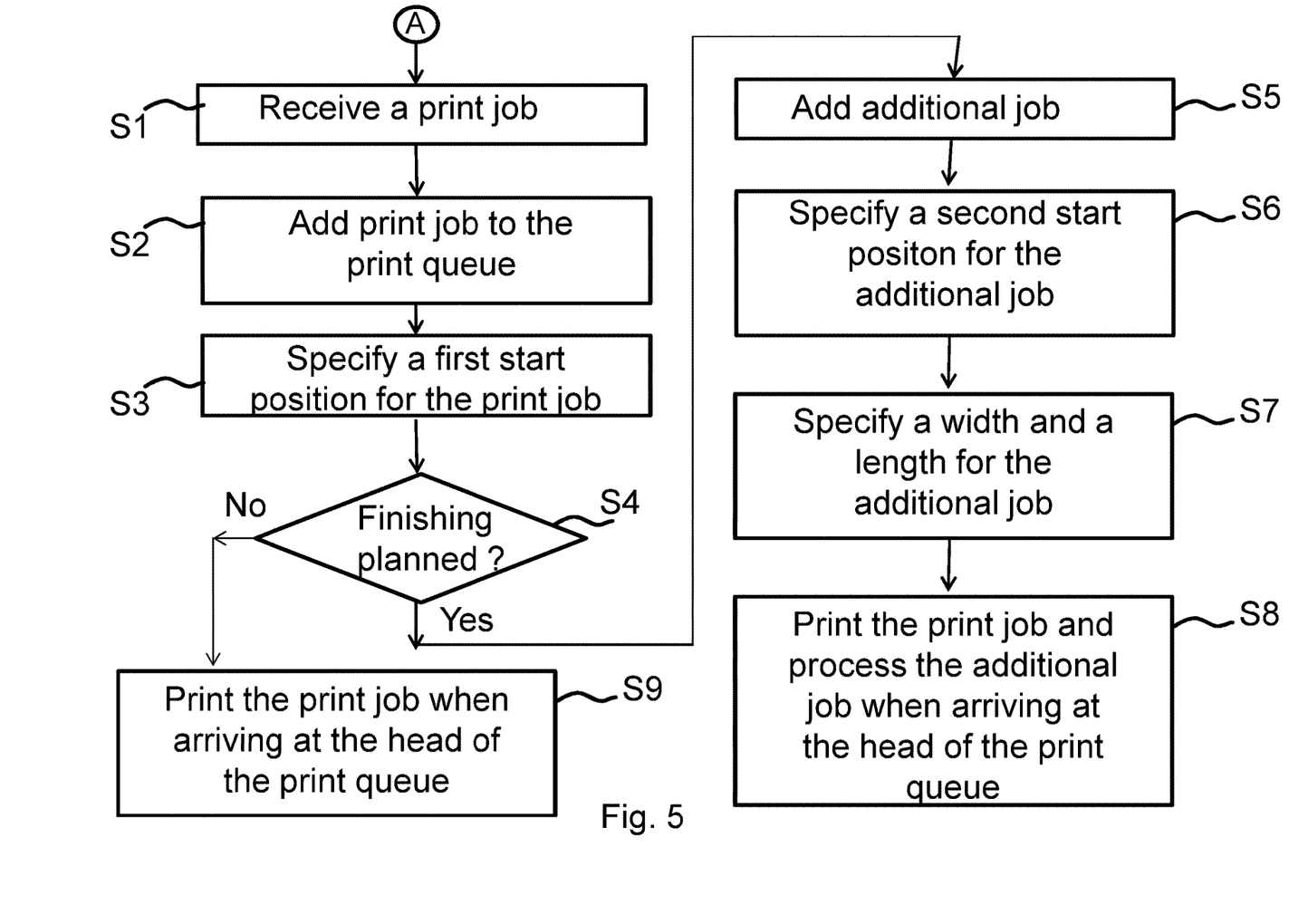
FIG. 5 shows a schematic flow diagram illustrating a method according to an embodiment of the invention.
Figure 6:
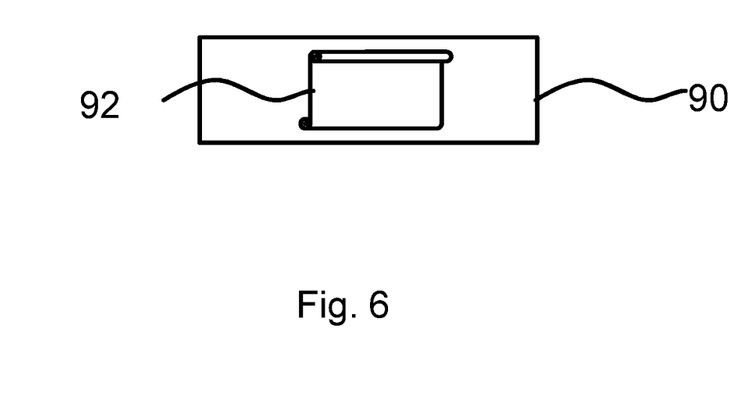
FIG. 6 schematically shows a non-transitory software medium according to an embodiment of the invention.

FIG. 3 schematically shows a view of a recording medium 1 for illustrating the function of the roll-fed printing apparatus of FIG. 1 according to the invention as well as for illustrating the method of FIG. 5 according to the invention.

In FIG. 3, a vertical line symbolizes a current position 29 of the print head within the individual ripped images. Regarding the following discussion, it is assumed that the current position 29 corresponds to a location along the length of the recording medium 1 at which the print engine 20 is arranged to mark the recording medium 1 currently. Furthermore the print engine 20 may be a print head moving along the breadth B of the recording medium 1 in reciprocation along a scanning direction. By moving in reciprocation marking material are deposited on the recording medium 1 in swathes.

All parts of the individual ripped images that are positioned to the left (i.e. downstream) of the current position 29 (these parts are shown as hatched in FIG. 3) have been printed; all parts of the individual ripped images that are positioned to the right (i.e. upstream) of the current position 29 (these parts are shown as un-hatched rectangles in FIG. 3) have not yet been printed.

Figure 4:
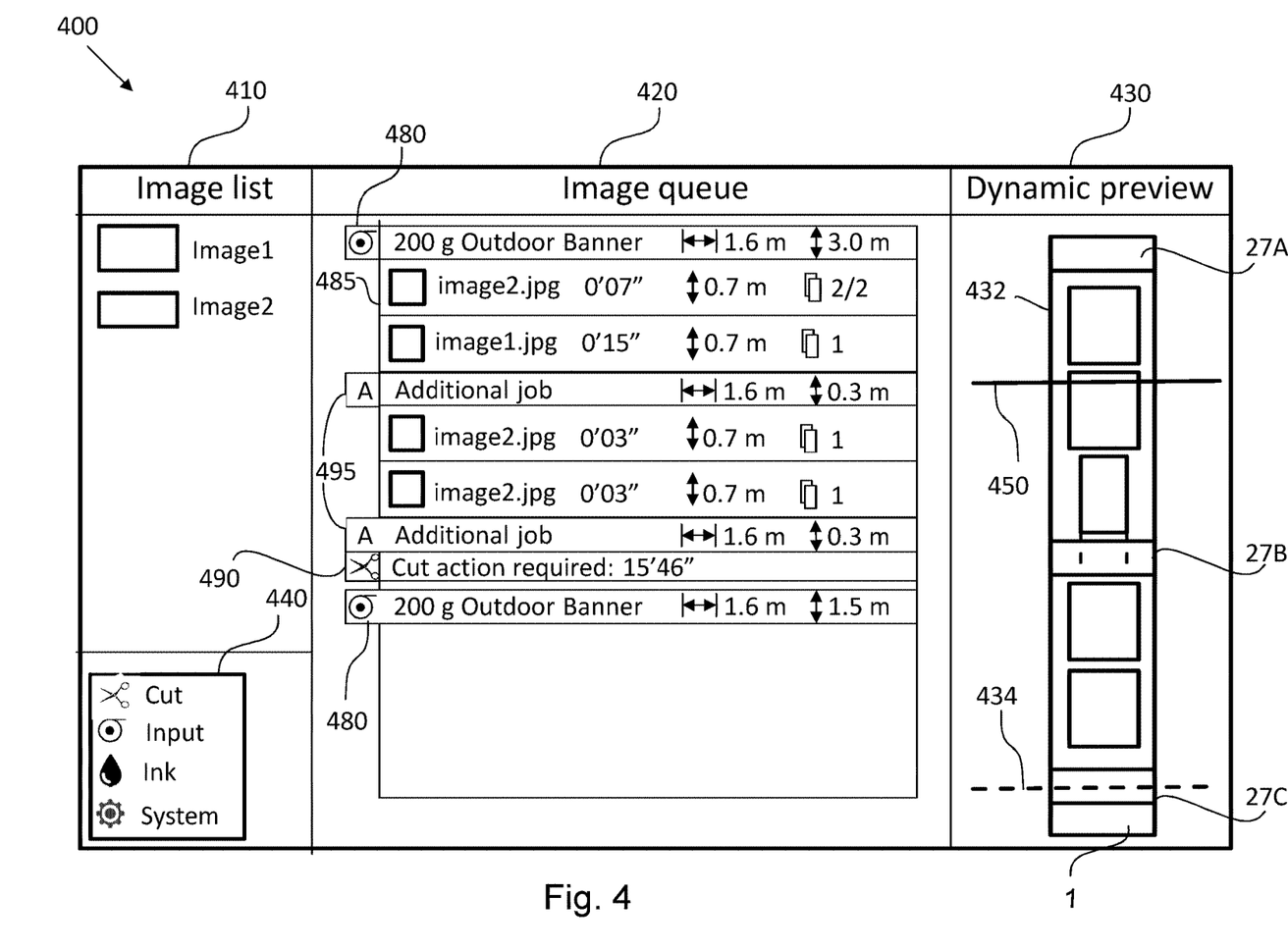
FIG. 4 schematically shows a view of a user interface window of a roll planning system according to the invention.

The terms "downstream" and "upstream" are used here with respect to the representation of the six images on the dynamic roll preview area 430 in FIG. 4 (instead of with respect to the recording medium 1) in the sense that an upstream direction can be designated for the representations of the six images as the direction that would be upstream for the recording medium 1, and equally for the downstream direction.

It is evident from FIG. 3 that the individual ripped image 22 has been completely printed. The individual ripped images 24-26 have not yet been printed even partially. The individual ripped image 23 is intersected by the current position 29 such that each consists of a portion that has already been printed, and a portion that has not yet been printed. Accordingly, the individual ripped image 23 has not been printed completely (only partially).

In a particular case, according to the specifications of ripped images 22-26 submitted to the roll-fed printing apparatus 100 from the raster image processor 50 (See FIG. 1) the ripped images 22-26 should be laminated. In order to facilitate a flawless laminating process, automatically an additional job 27A has been added to the print queue at the beginning of printing on the recording medium 1 according to the invention. A width and a length on the recording medium for processing the additional job has been specified which are determined by the laminating action. In this case the width of the recording medium needed for the additional job 27A is the whole width B of the recording medium 1. In this case the length of the recording medium 1 needed for the additional job 27A may be determined by the time needed to prepare the laminator for the laminating process, i.e. due to a warm up of the laminator or due to deposit the laminate sufficiently flat on the recording medium over the specified width of the recording medium 1, and/or by the time needed to prepare the recording medium 1 for the laminating process, i.e. due to a warm up of the recording medium 1.

In FIG. 3 the additional job 27A has already been performed. The additional job 27A is a non-printing job during execution of which the recording medium 1 has been moved relative to the print mechanism without any printing over an area which corresponds to the specified length and width B.

As the individual ripped image 24 is smaller in width than the subsequent ripped image 25, a cutting process of printed image 24 out of the roll 1 with cut lines c1 and c2 may be problematic as explained here-above. Therefore, according to the invention an additional job 27B has been automatically added to the print queue between the ripped image 24 and the ripped image 25. The cutting of the printed image 24 along the cut lines c1 and c2 may intrude in the area of the additional job 27B as indicated by the dashed lines c1, c2, but will not damage the subsequent printed image 25. The width of the recording medium 1 needed for the additional job 27B may be the whole width B of the recording medium 1. The length of the recording medium 1 needed for the additional job 27B is determined by the time needed for the adaptation of positions of the cut knifes 281, 282 in the direction B.

Another example is that in order to post-process the number of printed images 22-26 on the recording medium 1, a predetermined amount L of length meters of the roll 1, for example 8 meters, is desired for the post-processing machine, so a predetermined cut may be planned every 8 meters of the roll 1. According to the invention the controller 10 of the roll-fed printing apparatus 100 is configured to add an additional job 27C every 8 meters.

FIG. 4 shows a user interface window 400 controlled by the roll managing system 12. The user interface window 400 comprises an image queue area 420, a dynamic roll preview area 430 and a specification area 440.

The specification area 440 is configured to specify finishing actions (e.g. "Cut"), recording medium properties (e.g. "Input"), marking material properties (e.g. "Ink"), and system settings of the roll-fed printing apparatus 100 (e.g. "System").

According to a further embodiment the user interface window 400 comprises an image list area 410. Note that the image list area 410 is not necessary when the ripped images are received by the controller 10 and automatically added to the image queue represented in the image queue area 420. The image list area 410 comprises images 1-2 which may be dragged and dropped in the image queue area 420 or in the dynamic roll preview area 430.

When an image is dropped in the image queue area 420, the dynamic roll preview area 430 will be automatically updated by adding a representation of the image to the preview 432 of the roll in the dynamic roll preview area 430. When an image is dropped in the dynamic roll preview area 430, the image queue area 420 will be automatically updated by adding a representation of the image to the image queue in the image queue area 420. In other words the image queue area 420 and the dynamic roll preview area 430 are continuously synchronized.

In the example in FIG. 4 image2—which corresponds to the image 22 in FIG. 3—has already been printed and is not visible any more in the image queue area 420. Image2 is currently being printed for a second time according to the specifications of the image2. The recording medium 1 on which image2 is currently being printed is indicated by a recording medium line 480 in the image queue area 420. The image recording medium line 480 shows the type of recording medium, for example "200 g Outdoor Banner", the width of the recording medium, for example 1.6 m., and the roll length currently planned to be printed plus the already printed roll length of the recording medium, for example 1.5 m. The currently planned length or the currently remaining length may be at least part of an indication for an actual status of the recording medium 1.

Image2—which corresponds to the images 22, 23, 25, 26 in FIG. 3—is represented in the image queue area 420 by means of image lines 485. The image lines 485 comprise an identification of the image, for example a corresponding thumbnail and a name "image2.jpg", a time left to print the complete image2, for example 7 minutes, a length piece of the recording medium which is occupied by the image2 when printed, for example 1.5 m., and an indication of the number of copies of the image2 to be printed, for example 2 copies.

The image queue area 420 may also comprise a finishing line 490 comprising an indication for a finishing action like a cutting action and a time indication when the finishing action has to be executed, for example 15 h 46 m. It is noted that after the cutting action at 15 h 46 the same roll will be input in the roll-fed printing apparatus 100 as indicated by a recording medium line indicating a recording medium type of "200 g Outdoor Banner". The time indication in the finishing line 490 indicates an actual status of a timing of the ripped images to be printed and a timing of the corresponding additional job 27C according to the invention.

The image queue area 420 may comprise at least one additional job line 495 comprising an indication for an additional job according to the invention. Also a width and a length of the additional job is specified in the additional job line 495. Two additional job lines 495 are shown in the image queue area 420 in FIG. 4 which correspond to the additional jobs 27B and 27C as shown in FIG. 3 and as shown in the dynamic roll preview area 430 in FIG. 4.

The dynamic roll preview area 430 comprises a representation 432 of at least part of the recording medium 1 to be printed upon.

The current position of the print head is reflected in the dynamic preview area 430 by an unbroken line 450. The unbroken line 450 corresponds to the current position 29 of the print head shown in FIG. 3. The unbroken line 450 represents an actual status of printing of the created subsequent image swathes and an actual status of the additional jobs 27A, 27B, 27C according to the invention.

The cutting position corresponding to the cutting action 490 planned at 15 h 46 m is represented in the dynamic preview area 430 by a dashed line 434. The dashed line 434 intersects the additional job representation 27C in the dynamic preview area 430 as to indicate that the cutting action will take place in the area of the recording medium indicated by the position, the width and the length of the additional job representation 27C in the dynamic preview area 430.

According to another embodiment the cutting action 490 is preceded by an additional job, for example numbered as 27C' (not shown) and succeeded by another additional job, for example numbered as 27C" (not shown). The length and the width of the additional job 27C' may be equal to the length and the width of the other additional job 27C" respectively. The sum of the length of the additional job 27C' and the length of the other additional job 27C" may be equal to the length of the additional job 27C shown in FIG. 4.

The dynamic roll preview area 430 displays the positions on the roll at which the images are going to be printed. When an operator wants to change a position of an image to be printed on the recording medium 1, the representation of the image in the dynamic roll preview area 430 may be moved to another (X,Y) position in the dynamic roll preview area 430. A position of each representation of an image in the dynamic roll preview area 430 is saved to memory 14 in the roll managing system 12 and used by the controller 10 for creation of an appropriate swath image which is going to be printed by the print engine 20.

When a move of an image in the dynamic roll preview area 430 causes another order of printing the images on the recording medium, the order of the images in the image queue area 420 is automatically adapted.

A new finishing line may be introduced in the image queue area 420 by dragging a finishing symbol in the specification area 440, for example a scissor symbol for a cut, to an appropriate position in the image queue area 420 or to an appropriate position in the dynamic roll preview area 430. Only one kind of finishing symbol is shown in the specification area 440, but other kinds of finishing symbols may be envisioned and incorporated in the user interface window 400.

A new recording medium line may be introduced in the image queue area 420 by dragging a recording medium symbol ("input") in the specification area 440 to an appropriate position in the image queue area 420 or to an appropriate position in the dynamic roll preview area 430. If a width of the new recording medium is deviating from a recording medium are presented in the dynamic roll preview area 430, the width of the new recording medium in the dynamic roll preview area will be automatically adapted upon dropping the recording medium symbol in the image queue area 420 or the dynamic roll preview area 430.

A new additional job recording medium line may be automatically introduced in the image queue area 420 by the roll managing system 12 applying one of the decision rules explained here-above according to the invention. A new representation of the new additional job is automatically added to an appropriate position in the dynamic roll preview area 430.

A recording medium line according to the invention is editable in the image queue area 420 for editing the medium type, the width and the (remaining) length of the recording medium to be represented by the recording medium line.

By indicating a time of a cutting action, a time of an additional job, and a time of a roll change in the lines 490, 495, 480 respectively, the operator can plan to have the needed recording medium available at the input section 3 of the roll-fed printing apparatus 100 at the indicated time and he can attend the roll-fed printing apparatus 100 at the indicated time in order to establish a correct finishing action and/or a correct roll change.

FIGS. 2-4 show only one recording medium 1 at a time, but the method may also be applied to a roll-fed printing apparatus which is a multiple roll printer which is able to print simultaneously on multiple rolls positioned on a common axis. In the latter case the roll preview area comprises a digital visual representation of each roll and a digital representation of a ripped image may be positioned on either roll. The additional job may have a total width of a sum of the widths of the multiple rolls and a length which is the same for all multiple rolls. However, an additional job may also be introduced for a single roll of the multiple rolls, for example if a rule mentioned here-above only applies to that single roll. For example, one of the multiple rolls has to be laminated, one of the multiple rolls has a ripped image which width is larger than a width of the previous scheduled ripped image which has cutting actions as described hereabove for images 24 and 25 in FIG. 3, etc.

FIG. 5 shows a schematic flow diagram illustrating a method according to the invention. The method is suitable for controlling a roll-fed printing apparatus according to the invention.

The method starts in a starting point A and leads to a first step S1.

In the first step S1 a print job with print job settings is received at the roll-fed printing apparatus. The print job contains at least one ripped image.

In a second step S2 the print job is added to a print queue of the roll-fed printing apparatus.

In a third step S3 a first start position on the recording medium is specified for printing the print job. The print job settings may include a finishing action to be executed when printing the print job.

In a fourth step S4 it is checked whether or not a finishing action according to the invention is planned. The check can be done on the print job settings or system settings of the roll-fed printing apparatus.

If a finishing action according to the invention is planned, in a fifth step S5 an additional job is automatically added to the print queue in order just behind the print job or in order just before the print job.

If no finishing action according to the invention is planned, in a ninth step S9 the print job is printed when the print job arrives at the head of the print queue.

In a sixth step S6 a second start position on the recording medium is specified for processing the additional job in a neighborhood on the recording medium of the print job. The second start position is specified by the roll managing system 12 of the roll-fed printing apparatus 100.

In a seventh step S7 a width and a length on the recording medium is specified for processing the additional job, the width and the length determined by the kind of the finishing action. The width and length are specified by the roll managing system 12 of the roll-fed printing apparatus 100.

In an eighth step S8, upon arrival of the print job at the head of the print queue or upon arrival of the additional job at the head of the print queue whichever arrives at first, the print job is printed at the first start position and the additional job is executed at the second start position respectively. The additional job is a non-printing job during execution of which the recording medium is moved relative to the print mechanism without any printing at the second start position over an area which corresponds to the specified length and width. A sequence order of printing the print job and processing the additional job depends on the order of these two jobs in the print queue.

FIG. 5 schematically shows a software medium 90 according to an embodiment of the second aspect. The software medium 90 comprises executable code 92 configured to, when executed, perform the method of the first aspect, e.g. as described with respect to either the roll-fed printing apparatus 100 or the method of controlling the roll-fed printing apparatus 100, according to any or all of the FIGS. 1 to 4 and/or according to any of the variants and modifications of the roll-fed printing apparatus 100 and/or of the method described herein.

The software medium may, specifically, be formed as a CD or a CD-ROM, a DVD or a DVD-ROM, a BluRay disc or a BluRay-ROM disc, a magnetic hard drive, a solid state disk (SSD) hard drive, a USB memory device and so on.

While detailed embodiments of the present invention are disclosed herein, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. In particular, features presented and described in separate dependent claims may be applied in combination and any advantageous combination of such claims are herewith disclosed.

Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language).

It will be evident that the described embodiments may be varied in many ways. All such modifications as would be evident to one skilled in the art starting from what is explicitly described are intended to be included.

The invention claimed is:

1. A method for controlling a roll-fed printing apparatus for printing print jobs on a recording medium by means of a print mechanism, the recording medium having a width with a direction perpendicular to a transport direction of the recording medium, the method comprising the steps of:
   receiving a print job with print job settings,
   adding the print job to a print queue of the roll-fed printing apparatus,
   specifying a first start position on the recording medium for printing the print job,
   due to a planned lengthwise cut of the recording medium by a cutter having two cut knifes for cutting in the transport direction of the recording medium automatically adding an additional job to the print queue in order just behind the print job or in order just before the print job,
   specifying a second start position on the recording medium for processing the additional job in a neighborhood on the recording medium of the print job,
   specifying a width and a length on the recording medium for processing the additional job, the width and the length determined by the time needed for an adaptation of positions of the cut knifes in the width direction of the recording medium,
   upon arrival of the print job at the head of the print queue or upon arrival of the additional job at the head of the print queue whichever arrives at first, printing the print job and processing the additional job at the first start position and at the second start position respectively,
   wherein the additional job is a non-printing job during execution of which the recording medium is moved relative to the print mechanism without any printing at the second start position over an area which corresponds to the specified length and width.

2. The method of claim 1,
   wherein the planned finishing action is specified in the print job settings of the print job.

3. The method according to claim 1,
   wherein the planned lengthwise cut is planned along a printed image of the print job, the width of the printed image being not equal to the width of an image of a subsequent print job in the print queue, and the additional job is added in time just behind the print job in the print queue and just before the subsequent print job.

4. The method according to claim 1,
wherein the lengthwise cut of the recording medium is planned between a first image of the print job intended to be printed at the first starting position and a second image of the same print job or a subsequent print job in the print queue which second image is intended to be printed next to the first image in a widthwise direction, and the method comprises the step of adjusting a starting position on the recording medium for printing the second image such that the additional job is arranged in between a location on the recording medium at which the first image is intended to be printed and a location on the recording medium at which the second image is intended to be printed.

5. The method of claim 4,
wherein a size of the first image is not equal to a size of the second image.

6. The method according to claim 1,
wherein another planned finishing action is a widthwise cut of the recording medium along an entire width of the recording medium, and one other additional job is added in the queue such that the second starting position on the recording medium of the one other additional job is in accordance with a constant predetermined distance interval in a lengthwise direction of the recording medium.

7. A roll-fed printing apparatus for printing images on a recording medium having a width with a direction perpendicular to a transport direction of the recording medium, comprising:
a controller for controlling a print queue comprising a print job to be printed; and
a cutter having two cut knifes for cutting in the transport direction of the recording medium,
wherein the controller is configured
to automatically add due to a lengthwise cut of the recording medium in the transport direction of the recording medium by the cutter an additional job in the print queue just before or just after the print job,
to specify a starting position for the additional job on the recording medium in a neighborhood of the print job on the recording medium, and
to specify a width and a length on the recording medium for processing the additional job, the width and the length determined by a time needed for an adaptation of positions of the cut knifes in the width direction of the recording medium, and wherein the additional job is a non-printing job during execution of which the recording medium is moved relative to the print mechanism without any printing at the start position over an area which corresponds to the specified length and width.

8. A non-transitory software medium comprising executable code configured to, when executed, perform the method according to claim 1.

* * * * *